US010235203B1

(12) United States Patent
Cummins et al.

(10) Patent No.: US 10,235,203 B1
(45) Date of Patent: Mar. 19, 2019

(54) TECHNIQUES FOR INCREASING STORAGE SYSTEM PERFORMANCE IN PROCESSOR-BOUND WORKLOADS WITH LARGE WORKING SETS AND POOR SPATIAL LOCALITY

(71) Applicant: EMC Corporation, Hopkinton, MA (US)

(72) Inventors: Daniel Cummins, Hudson, NH (US); David W. Harvey, Newton, MA (US); Steve Morley, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 790 days.

(21) Appl. No.: 14/230,118

(22) Filed: Mar. 31, 2014

(51) Int. Cl.
G06F 9/48 (2006.01)
G06F 12/0811 (2016.01)
G06F 12/0868 (2016.01)

(52) U.S. Cl.
CPC ........ G06F 9/4881 (2013.01); G06F 12/0811 (2013.01); G06F 12/0868 (2013.01)

(58) Field of Classification Search
CPC ............... G06F 9/4881; G06F 12/0811; G06F 12/0868; G06F 13/00; G06F 3/0659; G06F 3/0656; G06F 9/5005; G06F 12/0806
See application file for complete search history.

(56) References Cited

U.S. PATENT DOCUMENTS 6,226,713 B1 * 5/2001 Mehrotra ............ G06F 12/0859
711/109
7,293,136 B1 * 11/2007 More .................... G06F 3/0656
710/40
7,353,337 B2 4/2008 Wester et al.
7,603,485 B2 * 10/2009 Komikado .............. G06F 3/061
710/5
8,789,033 B2 7/2014 Aslot et al.
2002/0056007 A1 * 5/2002 Gersht ................ H04L 12/5695
709/235
2003/0226133 A1 12/2003 Grover
2009/0248994 A1 * 10/2009 Zheng ................... G06F 9/5016
711/151
2013/0111141 A1 * 5/2013 Kessler .................... G06F 12/08
711/130

FOREIGN PATENT DOCUMENTS

WO WO 9915953 A1 * 4/1999 ............ G06F 3/0611

* cited by examiner

Primary Examiner — David J. Huisman
Assistant Examiner — Courtney P Carmichael-Moody
(74) Attorney, Agent, or Firm — BainwoodHuang

(57) ABSTRACT

An improved technique involves processing a workflow in stages, and processing all requests in a queue for a given stage before moving onto the next stage. Along these lines, each request received by a storage processor is assigned to a core and placed in a first queue for that core. Within that core, a single system thread executes first instructions for a task, e.g., checking the storage cache for the requested data from a request, and then transfers the request to a second queue. Rather than perform additional tasks to completely satisfy the request, however, the thread executes the first instructions for a prespecified number of requests in the first queue. Only when the thread has executed instructions for the prespecified number of requests, the thread begins execution of second instructions for requests in the second queue, and work on the next task begins.

16 Claims, 8 Drawing Sheets

TECHNIQUES FOR INCREASING STORAGE SYSTEM PERFORMANCE IN PROCESSOR-BOUND WORKLOADS WITH LARGE WORKING SETS AND POOR SPATIAL LOCALITY

BACKGROUND

Storage systems have storage disks from which data is read or to which data is written, and a storage processor that performs read and write operations in response to receiving read and write requests, respectively. Typically, the storage processor in such a system has multiple cores, as well as memory that stores instructions and data used in carrying out the requests. Furthermore, the system itself has a storage cache that stores frequently accessed data.

In conventional storage systems, the storage processor carries out a task from each request through to completion using a single execution thread. For example, upon receiving a request from a host to read data from storage, the storage processor places the request in a queue of a core and begins processing the request. To carry out the request, the thread initially accesses a working set of instructions for checking whether the requested data is stored in the storage cache. When there is a storage cache miss, the thread accesses further instructions from the working set for translating a logical address of the requested data to a physical address on disk. Upon receiving the physical address, the thread accesses instructions from the working set for retrieving the data from the physical location in disk. Finally, to complete the task, the thread returns the data to the requesting host.

SUMMARY

In modern, multi-core storage processors, each core has an per-core processor cache for storing instructions and data that are most frequently used, and there is higher-level shared processor cache for storing instructions and data less frequently used than that stored in per-core cache, but still more often than those stored in memory. For small tasks involving small working sets with good spatial locality, the instructions and data may fit within the per-core processor cache of their respective core. This vastly improves the speed of the task. Even when the instructions and data of the working set do not fully fit within the per-core processor cache, they may still fit in the shared processor cache; this is still a large improvement over retrieval from memory.

A processing thread of a storage processor, however, uses a large working set with poor spatial locality, creating deficiencies with the above-described conventional storage systems. For example, the amount of memory required in such working sets will be much larger than that available in processor cache. Thus the storage processor will be forced to thrash, or swap data frequently between the processor cache and memory as each request progresses along its workflow. Such thrashing may significantly slow the servicing of requests to completion.

In contrast to the above-described conventional storage systems in which requests that involve large working sets with poor spatial locality may suffer significantly slow processing, an improved technique involves processing a workflow in stages, and processing all requests in a queue for a given stage before moving onto the next stage. Along these lines, each request received by a storage processor is assigned to a core and placed in a first queue for that core. Within that core, a single system thread executes first instructions for a task, e.g., checking the storage cache for the requested data from a request, and then transfers the request to a second queue. Rather than perform additional tasks to completely satisfy the request, however, the thread executes the first instructions for a prespecified number of requests in the first queue. Only when the thread has executed instructions for the prespecified number of requests, the thread begins execution of second instructions for requests in the second queue, and work on the next task begins.

Advantageously, the improved technique minimizes thrashing and therefore provides for significantly faster processing of requests that involve large working sets with poor spatial locality. When the instructions for each task takes up less memory than that held in a processor cache, then there is no excessive switching of instructions in and out of cache as spatial localization is effectively improved.

One embodiment of the improved technique is directed to a method of processing read/write requests from requestors. The method includes, for each of the set of cores of the storage processor, receiving a set of read/write requests, each of the set of read/write requests being arranged to be serviced by a process run by that core, the process containing instructions and data and being arranged, upon execution, to carry out a set of tasks at corresponding stages of a workflow by which those read/write requests are fulfilled. The method also includes transferring, by that core, the set of read/write requests to a first queue for that core, the first queue being arranged to temporarily hold read/write requests being serviced by the process at a first stage of the workflow. The method further includes, for each of a plural number of the read/write requests stored in the first queue, executing, by that core, first instructions of the process to carry out a first task of the set of tasks at the first stage of the workflow. The method further includes transferring, by that core, each of at least one of the number of the read/write requests to a second queue for that core after execution of the first instructions for that read/write request, the second queue being arranged to temporarily hold read/write requests being serviced by the process at a second stage of the workflow, the process being configured to service the read/write requests stored in the second queue after the execution of the first instructions for all of the plural number of the read/write requests stored in the first queue.

Additionally, some embodiments of the improved technique are directed to an apparatus constructed and arranged to process read/write requests from requestors. The apparatus includes a network interface, memory, and a controller including controlling circuitry constructed and arranged to carry out the method of processing read/write requests from requestors.

Furthermore, some embodiments of the improved technique are directed to a computer program product having a non-transitory computer readable storage medium that stores code including a set of instructions which, when executed by a computer, cause the computer to carry out the method of processing read/write requests from requestors.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves processing a workflow in stages, and processing all requests in a queue for a given stage before moving onto the next stage. Along these lines, each request received by a storage processor is assigned to a core and placed in a first queue. Within that core, a single system thread executes first instructions for a task, e.g., checking the storage cache for the requested data from a request, and then transfers the request to a second queue. Rather than perform additional tasks to completely satisfy the request, however, the thread executes the first instructions for a prespecified number of requests in the first queue. Only when the thread has executed instructions for the prespecified number of requests, the thread begins execution of second instructions for requests in the second queue, and work on the next task begins.

Figure 1:
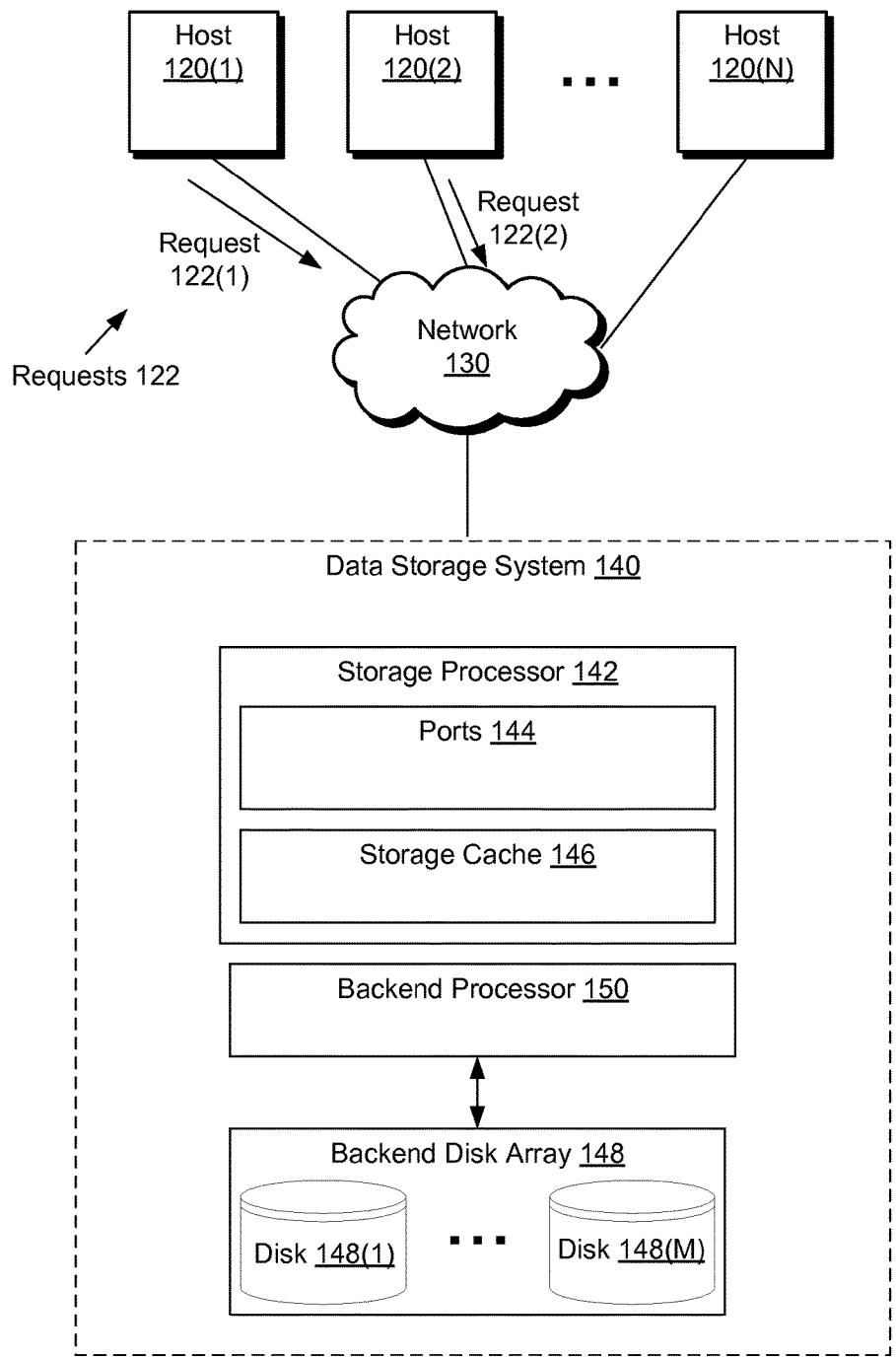
FIG. 1 is a block diagram illustrating an example electronic environment in which the improved technique is carried out.

FIG. 1 illustrates an electronic environment 100 for carrying out the improved technique. Electronic environment 100 includes hosts 120(1), 120(2), . . . , 120(N), where N is the number of hosts (hosts 120), communications medium 130, and data storage system 140.

Each of the hosts 120(n), 1<=n<=N, is arranged to send corresponding read/write requests 122(n) to data storage system 140 via network 130. For example, host 120(1) may be a desktop computer working within a corporate network 130. In this case, request 122(1) may be a request to read data stored in data storage system 140. Request 122(1) may have been initiated by a user clicking on a directory entry or inputting a path into a command line interface. Thus, read request 122(1) may contain a logical address of the data host 120(1) is to access.

It should be understood that other requests, say 122(2) from host 120(2), may be write requests for writing data to a logical address. Further, hosts 120 may take the form of any computing device such as a laptop computer, tablet computer, smartphone, server, and the like.

Network 130 provides network connections between hosts 12 and data storage system 140. Network 130 may implement a variety of protocols such as TCP/IP, UDP, ATM, Ethernet, Fibre Channel, combinations thereof, and the like. Furthermore, communications media 44 may include various components (e.g., cables, switches/routers, gateways/bridges, NAS/SAN appliances/nodes, interfaces, etc.). Moreover, Network 130 is capable of having a variety of topologies (e.g., queue manager-and-spoke, ring, backbone, multi drop, point to-point, irregular, combinations thereof, and so on).

Data storage system 140 is arranged to receive read/write requests 122 and provide access to stored data or disk space according to the request 122. An example of such a data storage system 140 is any of the VNX, VNX/e, or VMAX products made available by EMC Corp. of Hopkinton, Mass. Data storage system 140 includes storage processor 142, backend processor 150, and backend storage array 148.

Storage processor 142 is arranged to process read/write requests 122 received over network 130 quickly regardless of whether requests 122 have large working sets with poor spatial localization. Storage processor 142 is typically multi-core, but in some arrangements may have only a single core. Storage processor 142 includes a set of ports 144 and a storage cache 146.

Ports 144 are arranged to couple requests 122 into storage processor 140 for further processing. For example, ports 144 contain an I/O controller that decides which core to send a request $122(n)$.

Storage cache 146 is arranged to store hot data, or data that is most frequently accessed among the data stored in backend storage array 148. Storage cache 146 may be located in a specific physical location in backend disk array 148 or in memory.

Backend disk array 148 contains multiple storage disks 148(1), 148(2), . . . , 148(M), where M is the number of disks in backend disk array 148. In some arrangements, backend disk array 148 may arrange disks 148(1), . . . , 148(M) in a series of RAID arrays. In this case, data stored in disks 148(1), . . . , 148(M) would be arranged in stripes across the disks. Backend disk array 148 would store copies of stored data in different stripes according to the RAID scheme, e.g., RAID0, RAID1, etc.

It should be understood that data stored according to such schemes might have its physical location change according to the state of backend disk array 148. For example, if one of the disks, say, disk $148(m)$, goes off-line due to physical damage or the like, then storage processor 140 will have to find data stored in backend disk array 148 in another disk. To this effect, data elements stored in disk array 148 have a logical address that can be mapped to a physical address where that data element can be found.

Backend processor 150 is arranged to provide a mapping between a logical address specified by a request 122 and a physical address in backend storage array 148 where requested data is stored. Backend processor 150 may be a single-core or multi-core unit, akin to storage processor 142.

Further detail concerning storage processor 142 is now described in connection with FIG. 2.

Figure 2:
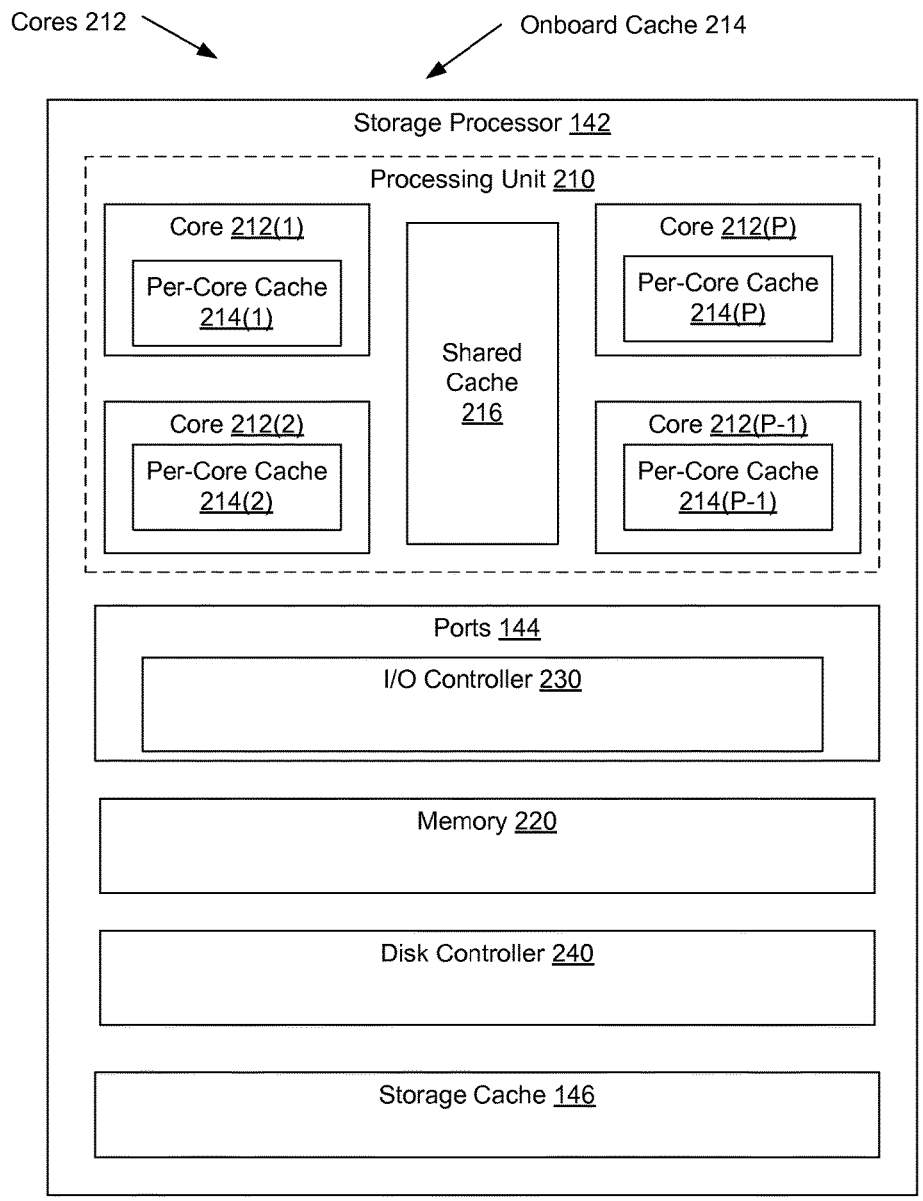
FIG. 2 is a block diagram illustrating an example storage processor within the electronic environment shown in FIG. 1.

FIG. 2 shows further detail of an example storage processor 142. Storage processor 142 contains a processing unit 210, ports 144, memory 220, backend processor 150, disk controller 240, and storage cache 146.

Processing unit 210 is arranged to provide processes that execute instructions from working sets from requests 122. Processing unit 210 contains multiple cores 212(1), 212(2), . . . , 212(P), and a shared cache 216.

Each core $212(p)$, $1<=p<=P$, is arranged to execute instructions for carrying out requests 122. Core $212(p)$ contains an per-core cache $214(p)$ which stores a relatively small amount of data and instructions that are typically most recently used for that core $212(p)$. In some arrangements, cache $214(p)$ contains L1 cache and L2 cache; in other arrangements, per-core cache $214(p)$ only contains L1 cache. It should be understood that L1 and L2 cache refer to a hierarchy of caches, in which L1 refers to that cache closest to the core and therefore having the smallest access times. Typically, L1 cache has 64 KB of memory, while L2 cache may have 256 KB of memory.

Shared cache 216, on the other hand, is shared among cores 212. Typically, shared cache 216 is L3 cache when per-core cache 214(*p*) has L2 cache, and is used when all available space is occupied in per-core cache 214(*p*) by current instructions.

Ports 144 are arranged to couple requests 122 into storage processor 140 for further processing. Ports 144 include an I/O controller 230 that directs requests 122 to various cores 212.

Memory 220 is arranged to store all instructions and data in use. As part of a hierarchy, memory 220 comes after per-core cache 214 and shared cache 216.

Further details concerning the actions of a core 212 in response to receiving a request 122 are discussed in detail in connection with FIG. 3.

Figure 3:
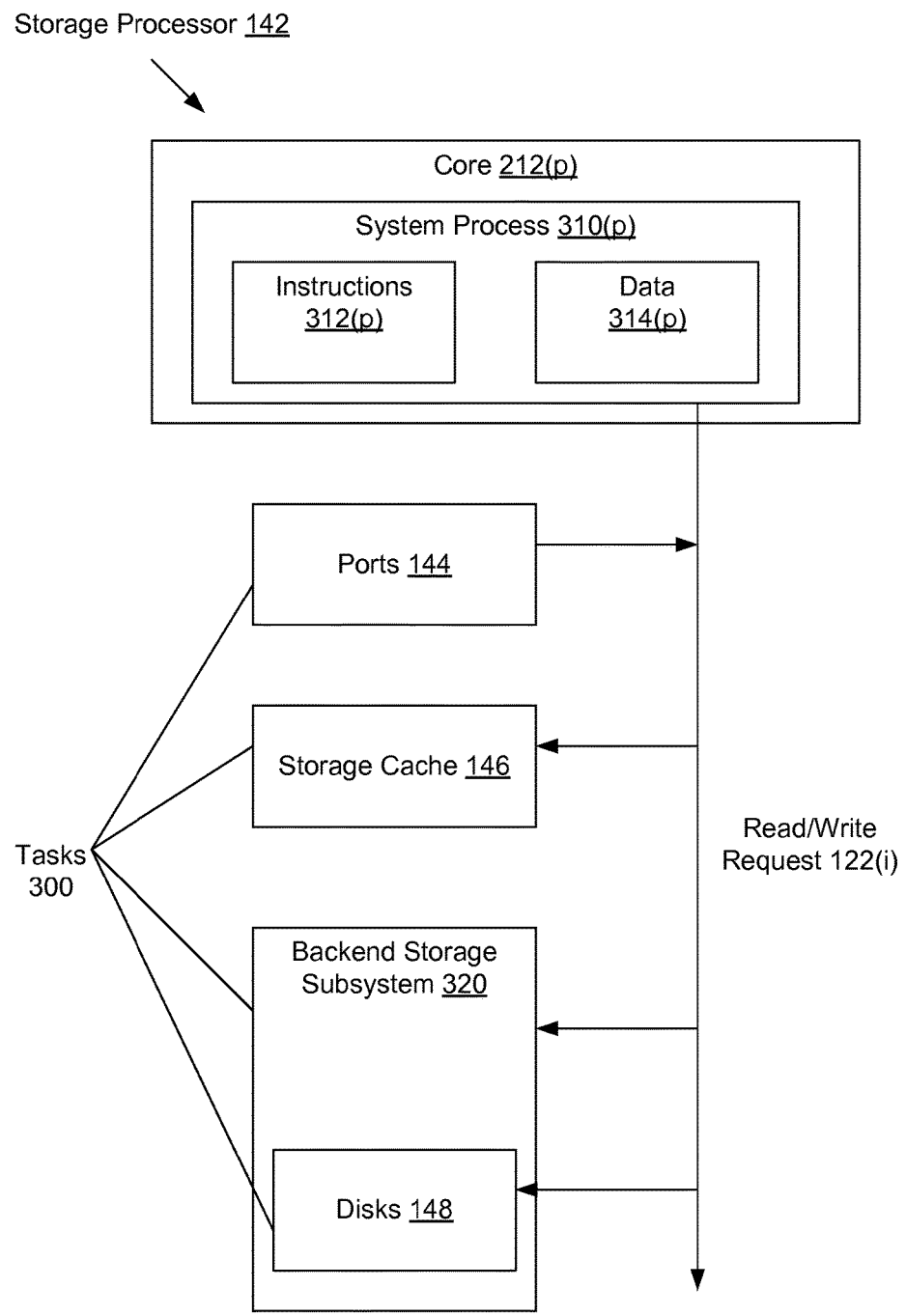
FIG. 3 is a block diagram illustrating an example process carrying out a read/write request within the electronic environment shown in FIG. 1.

FIG. 3 shows example tasks 300 carried out by a single system process 310(*p*) within a particular core 212(*p*). System process 310(*p*) accesses a working set of instructions 312(*p*) and data 314(*p*) in response to receiving a request 122(*i*). Tasks 300, in this case, are associated with ports 144, storage cache 146, and a backend storage subsystem 320 that includes disks 148 and backend processor 150. The aggregation of tasks 300 defines a workflow along which request 122(*i*) is carried out.

In this example workflow, tasks 300 are split up according to various stages involved in a read request. When request 122(*i*) is received by storage processor 142, ports 144 direct request 122(*i*) to a queue in core 212(*p*). When ready, process 310(*p*) accesses instructions 312(*p*) just for checking storage cache 146 for sought-after data. If there is a cache hit, then process 310(*p*) is arranged to return a result of the cache hit to the requesting host. If, on the other hand, there is a cache miss, process 312(*p*) brings the request to a queue at subsequent tasks 300 associated with the backend storage subsystem 320, where the sought-after data is ultimately retrieved from backend disks 148. Such tasks 300 may include converting a logical address to a physical address, and fetching the data at the physical address.

Tasks 300 are chosen with the goal of minimizing thrashing. That is, each task 300 should only involve enough instructions 312(*p*) and data 314(*p*) that may fit in per-core cache 214(*p*), if at all possible.

Figure 4:
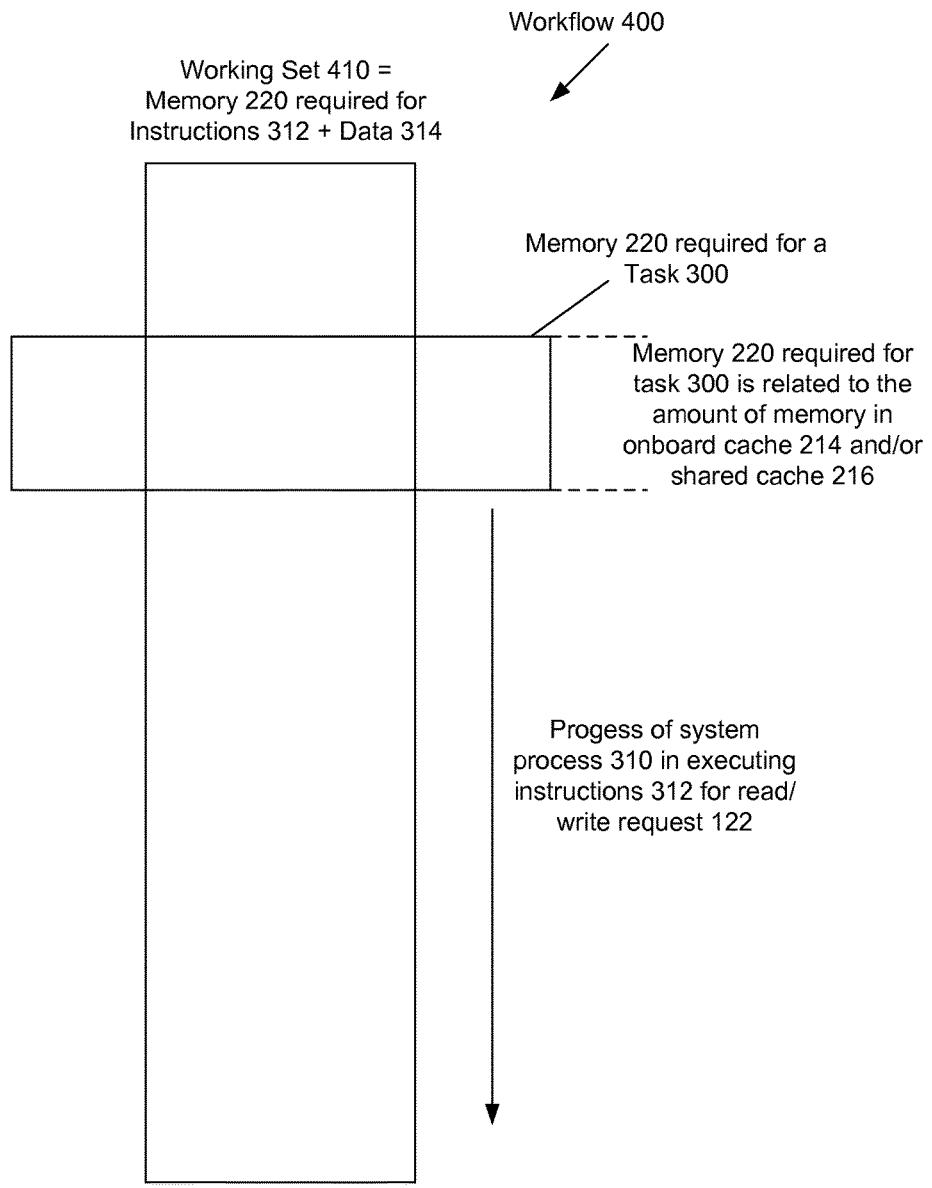
FIG. 4 is a block diagram illustrating an example working set used by the process illustrated in FIG. 3.

FIG. 4 illustrates an example workflow 400 in carrying out a request 122. Request 122 involves a working set 410 of instructions 312 and data 314 that occupies a certain amount of memory 220, which is far larger than that available in per-core cache 214. On the other hand, at any given instant along workflow 400, process 312 may only be using an amount of memory 220 that can, in fact, fit within per-core cache 214.

An idea emerges from this illustration: if requests 122 may be grouped into a core, say, 212(*p*), whose working sets use essentially the same instructions 312(*p*) and data 314(*p*) per task 300, then one may design a scheme in which these instructions and data may be used repeatedly in cache 212(*p*) without switching the instructions out to memory 220. Such a scheme would provide a significant speedup in the processing of these requests, and is discussed in detail in connection with FIG. 5.

Figure 5:
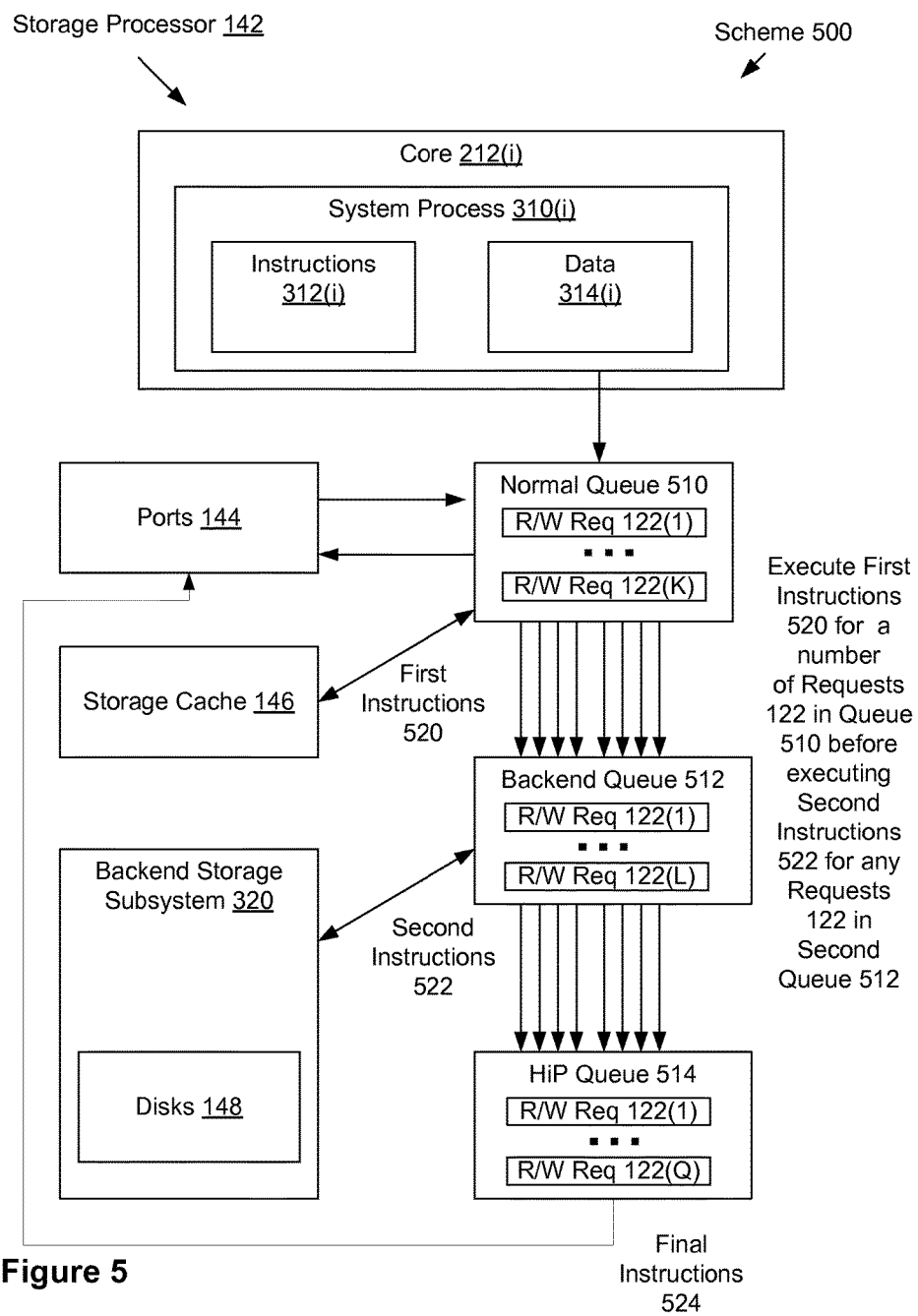
FIG. 5 is a block diagram further illustrating the example process shown in FIG. 3.

FIG. 5 shows an example of such a scheme 500 by storage processor 142. Scheme 500 involves introducing queues 510, 512, and 514 of requests 122 corresponding to the tasks of checking storage cache 146, accessing backend storage 320, and returning backend storage results, respectively.

During operation, storage processor 142 receives read/write requests 122 and arranges those with similar working sets into respective cores 212. Storage processor 142 places these requests 122 into normal queue 510 via ports 144 as requests 122 are received.

For requests 122 in normal queue 510, system process 310(*p*) accesses a portion of instructions 312(*p*) and data 314(*p*) in the form of first instructions 520 for carrying out the task of looking up a logical address in storage cache 146. The result of carrying out this task is either a cache hit (the data is in storage cache 146) or a cache miss (the data is not in storage cache 146).

For each request 122 resulting in a cache hit, system process 310(*p*) returns data associated with that logical address, and no further action need be taken with respect to that request 122.

On the other hand, for each request 122 resulting in a cache miss, system process 310(*p*) transfers that request 122 to a backend queue 512. For requests in backend queue 512, system process 310(*p*) accesses a portion of instructions 312(*p*) and data 314(*p*) in the form of second instructions 522 for carrying out the task of performing a backend storage access. Such an access involves mapping a logical address to a physical address in backend storage at which sought-after data may be found, and then fetching the data at that physical address.

It should be understood that scheme 500 produces significant speedup in processing when it executes first instructions 520 for a number of requests in normal queue 510 before executing second instructions 522 for any request in backend queue 512. For example, scheme 500 involves system process 310(*p*) executing first instructions 520 for twenty requests in normal queue before executing second instructions 522 for any requests in backend queue. This way, scheme 500 involves, as much as possible, executing only those instructions stored in per-core cache 214(*p*). By only using those instructions for the twenty requests in normal queue 510, thrashing is minimized.

It should also be understood that there is a tradeoff between having too small a number of requests processed in a queue at once and too large a number. If the number is too small, then scheme 500 would provide minimal improvement over simply carrying out each request in full, one at a time. If too large, however, then requests will overfill other queues and result in a starvation of resources. The number twenty is an example of a number that may work as an optimum in some situations; other numbers may provide in optimum in other situations. Thus, even though there are K requests in normal queue 510 pictured in FIG. 5, where K is greater than 20, only that fixed number of requests are to be serviced at once.

A similar principle applies to backend queue 512: process 310(*p*) executes second instructions 522 for requests in backend queue 512, some specified number at a time. It should be understood, however, that the dynamics of backend queue 512 differ from those in normal queue 510. In normal queue 510, ports 144 feed requests 122 as they arrive, and empty the requests as they are processed. In backend queue 512, however, the task involves accessing data at a physical address in disks 148. Such an access time may be lengthy; within that timespan, a new batch of requests may arrive in backend queue 512. Thus, rather than wait for the data to return after this lengthy time, process 310(*p*) may begin executing second instructions 522 for the new batch of requests 122. Such an alteration to scheme 500 may provide further speedup by reducing idle time in backend queue 522.

Once system process 320(p) has completed executing second instructions for a request 122 in backend queue 522 and returns a result (e.g., data accessed), system process 320(p) transfers that request 122 to high-priority ("HiP") queue 514. Again, system process 310(p) executes final instructions 524 to return results of second instructions to ports 144 and, ultimately, to the original requestors. System process 310(p) executes final instructions 524 for some number of requests at a time, as described above. In some arrangements, however, system process 310(p) drains HiP queue 514 before executing instructions for another queue.

Figure 6:
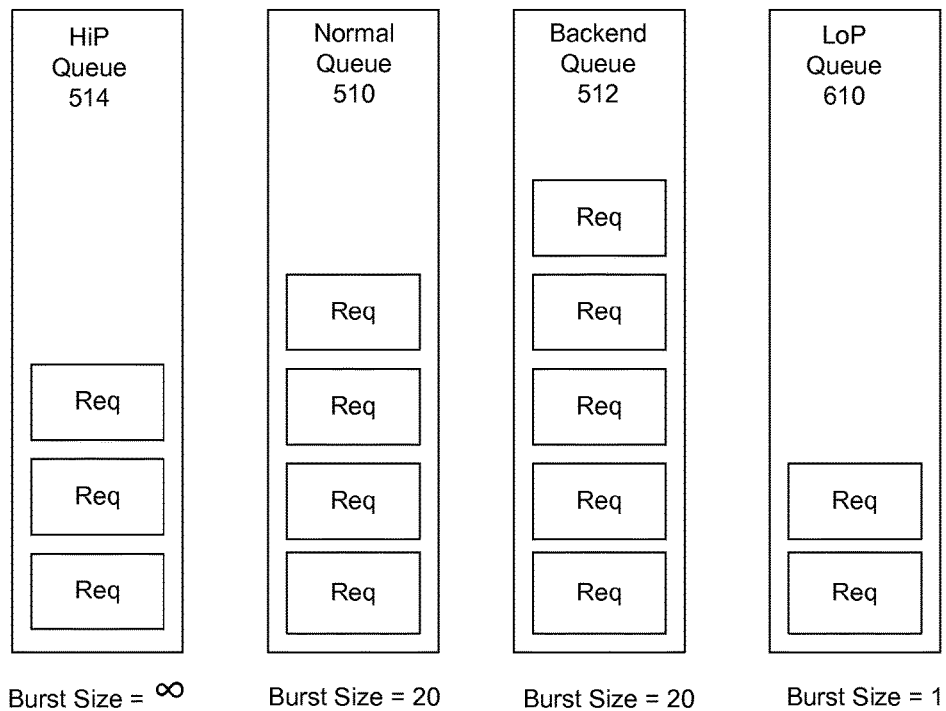
FIG. 6 is a block diagram illustrating example queues shown in FIG. 5.

FIG. 6 illustrates a summary of the above-mentioned queues. The number of requests that get serviced in a queue before servicing requests in another queue defines a burst size for that queue. As discussed above, example burst sizes for normal queue 510 and backend queue 512 are twenty requests. For HiP queue 514, however, which is drained of requests before moving on, the burst size is infinite.

In some arrangements, storage processor 142 may also define a low-priority ("LoP") queue 610 into which internal, rather than external, requests are transferred. The burst size of such a queue can be very small, e.g., one, without affecting the overall performance of the system process 310(p).

It should be understood that other degrees of freedom exists to further optimize the overall performance of the system process 310(p). For example, the queues may be acted upon by system process 310(p) in a nonlinear order that provides additional efficiencies over a more straightforward, linear evaluation. Such an ordering is illustrated in FIG. 7.

Figure 7:
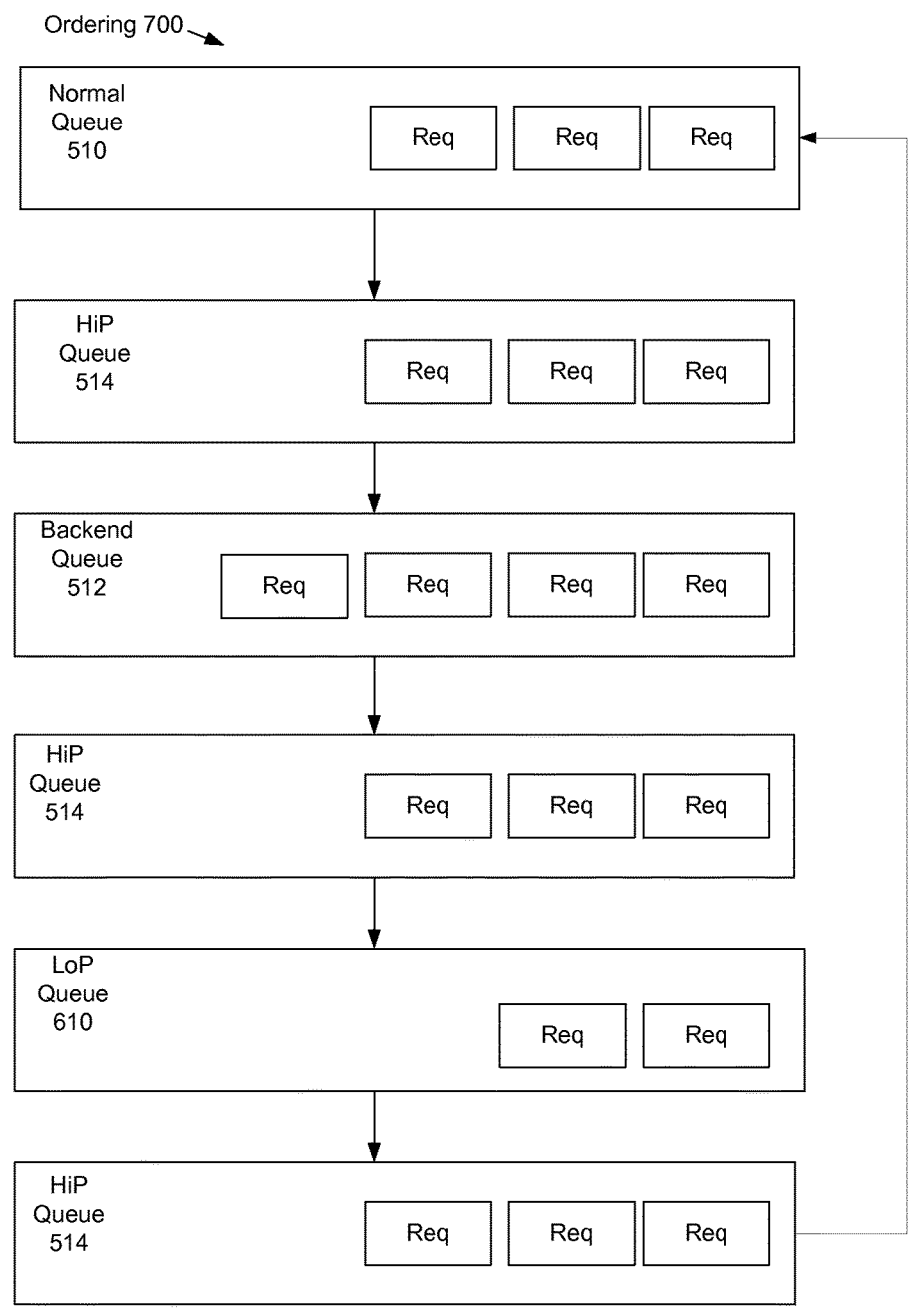
FIG. 7 is a flow diagram showing an example order in which requests in the queues illustrated in FIG. 6 are acted upon.

FIG. 7 illustrates an example ordering 700 of the queues that provides such efficiencies. In ordering 700:
  (i) a storage cache lookup is performed for the burst size of read/write requests in the normal queue;
  (ii) the return task is performed for each read/write request in the HiP queue until the HiP queue is empty;
  (iii) the backend storage lookup is performed for the burst size of read/write requests in the backend queue;
  (iv) the return task is performed for each read/write request in the HiP queue until the HiP queue is empty;
  (v) a low-priority task is performed for a request in the LoP queue; and
  (vi) the return task is performed for each read/write request in the HiP queue until the HiP queue is empty.

Ordering 700 has the advantage of recognizing that requestors want their results as soon as they get them, and judge system performance by the speed at which they receive these results (as opposed to fast internal processing, but large wait times in the final queue).

Figure 8:
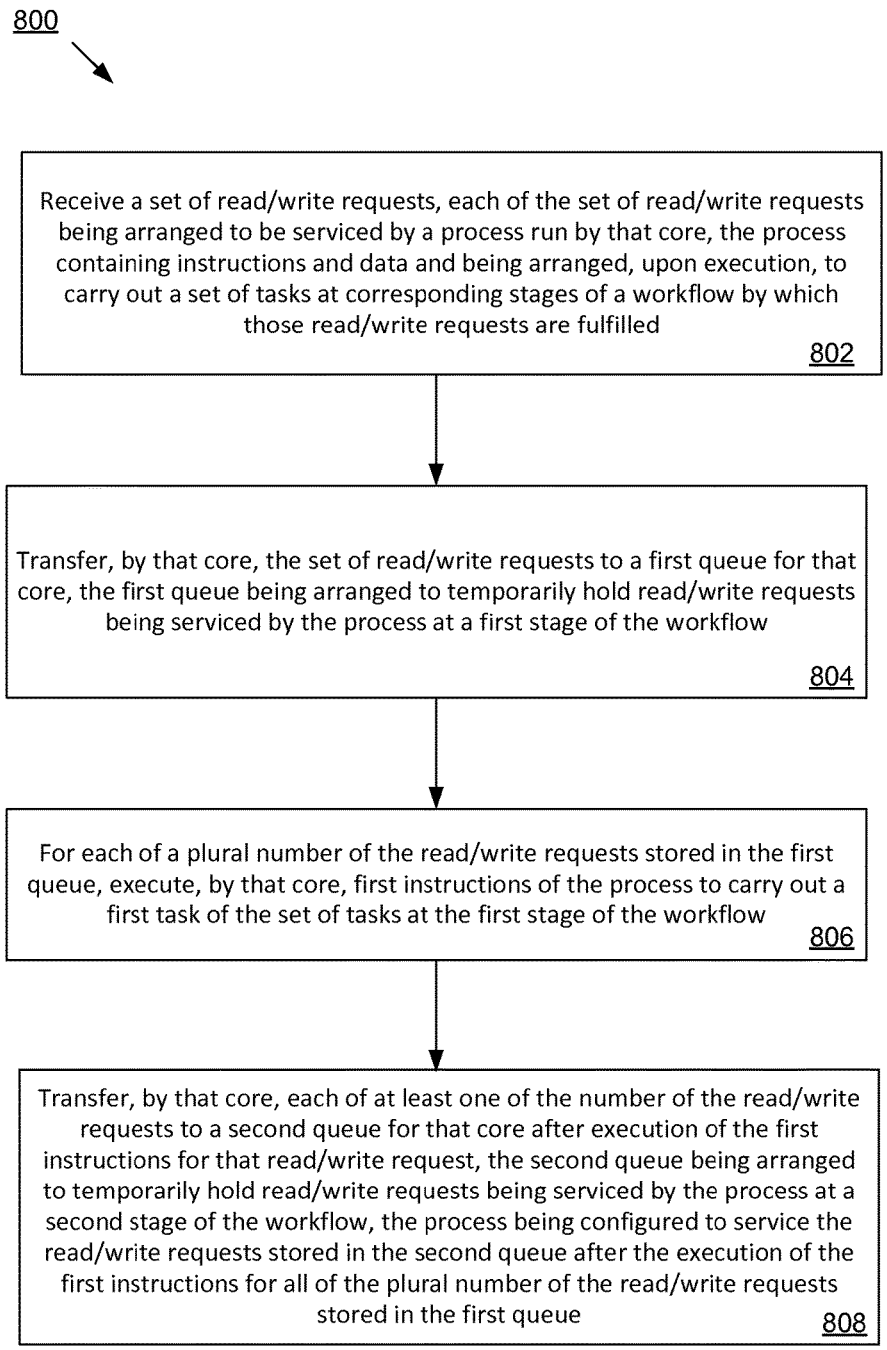
FIG. 8 is a flow chart illustrating an example method of carrying out the improved technique within the electronic environment shown in FIG. 1.

FIG. 8 illustrates a method 800 of processing read/write requests from requestors in a data storage system including a storage processor having a set of cores.

In step 802, storage processor 142 receives a set of read/write requests 122, each of the set of read/write requests being arranged to be serviced by a process 310(p) run by a core 212(p), the process 310(p) containing instructions 312(p) and data 314(p) being arranged, upon execution, to carry out a set of tasks 300 at corresponding stages of a workflow 400 by which those read/write requests 122 are fulfilled.

In step 804, that core 310(p) transfers the set of read/write requests 122 to a first queue, e.g., normal queue 510, for that core 212(p), the first queue 510 being arranged to temporarily hold read/write requests 122 being serviced by the process 310(p) at a first stage, e.g., storage cache 146, of the workflow 400.

In step 806, for each of a number of the read/write requests 122 in the first queue 510, that core 212(p) executes first instructions 520 of the process 310(p) to carry out a first task of the set of tasks 300 at the first stage of the workflow 400.

In step 808, that core 310(p) transfers each of at least one of the number of the read/write requests 122 to a second queue, e.g., backend queue 512, for that core 310(p) after execution of the first instructions 520 for that read/write request 122, the second queue 512 being arranged to temporarily hold read/write requests 122 being serviced by the process 310(p) at a second stage, e.g., backend storage 320, of the workflow 400, the process 310(p) being configured to service the read/write requests 122 in the second queue 512 after the execution of the first instructions 520 for all of the number of the read/write requests 122 in the first queue.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to storage processor 143, which is constructed and arranged to process read/write requests from requestors. Some embodiments are directed to a process of processing read/write requests from requestors. Also, some embodiments are directed to a computer program product which enables computer logic to cause a computer to process read/write requests from requestors.

In some arrangements, storage processor 143 is implemented by a set of cores or other types of control/processing circuitry running software. In such arrangements, the software instructions can be delivered, within storage processor 143, either in the form of a computer program product, or simply instructions on disk or in pre-loaded in memory 220 of storage processor 143, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a data storage system including a storage processor having a set of cores, a method of processing read/write requests received from requestors coupled to ports of the data storage system by a network, each read/write request being a storage read/write request directed to a respective addressable unit of secondary storage provided by the data storage system, the method comprising, for each of the set of cores of the storage processor:
  receiving a set of the read/write requests from the ports, the set of the read/write requests including multiple read/write requests, and assigning each of the set of the read/write requests to be serviced by a process run by that core, the process containing instructions and data and being arranged, upon execution, to carry out a set of tasks performed sequentially at corresponding stages of a workflow by which the set of the read/write requests are fulfilled;
  maintaining, by that core, a plurality of queues corresponding to respective stages of the workflow;
  storing, by that core, the set of the read/write requests in a first queue of the queues for that core, the first queue being arranged to temporarily hold read/write requests being serviced by the process at a first stage of the workflow;

for each of the set of the read/write requests in the first queue, executing, by that core, first instructions of the process to carry out a first task of the set of tasks at the first stage of the workflow; and transferring, by that core after the execution of the first instructions for all of the set of the read/write requests in the first queue, only selected ones of the set of the read/write requests from the first queue to a second queue of the queues for that core, the second queue being arranged to temporarily hold the selected ones of the set of the read/write requests to be serviced by the process at a second stage of the workflow, wherein the queues are ordered according to a predetermined order to process the set of the read/write requests at the corresponding stages of the workflow;

wherein the queues include a high-priority queue for storing read/write requests at a corresponding high-priority stage of the workflow;

wherein the predetermined order is a non-linear order in which the high-priority queue is serviced after each servicing of any lower-priority queues, and wherein the predetermined order includes:

first, processing requests of a normal queue to perform a storage cache lookup for a first burst size of read/write requests in the normal queue;

second, performing a return task for each read/write request in the high-priority queue until the high-priority queue is empty;

third, performing a backend storage lookup for a second burst size of read/write requests in a backend queue;

fourth, performing the return task for each read/write request in the high-priority queue until the high-priority queue is empty;

fifth, performing a low-priority task for a request in a low-priority queue; and sixth, performing the return task for each read/write request in the high-priority queue until the high-priority queue is empty.

2. A method as in claim 1, wherein the first task is a storage cache access to a storage cache located either in main memory of the storage processor or in a secondary storage device of the data storage system;

wherein the execution of the first instructions for a first read/write request stored in the first queue results in a storage cache hit; and wherein the return task comprises returning the result of the storage cache hit to a corresponding requestor of the first read/write request and excluding the first read/write request from the selected ones of the set of the read/write requests transferred to the second queue.

3. A method as in claim 1, wherein the first task is a storage cache access to a storage cache located either in main memory of the storage processor or it a secondary storage device of the data storage system;

wherein the execution of the first instructions for plural read/write requests stored in the first queue results in respective storage cache misses; the method further comprising including the plural read/write requests in the selected ones of the set of the read/write requests transferred to the second queue in the transferring step.

4. A method as in claim 1, wherein each of the queues is arranged to temporarily hold respective read/write requests being serviced by the process at respective stages of the workflow;

wherein one of the queues is a final queue for a final stage of the workflow, the final stage including the return task for a particular read/write request of returning a response to a requestor from which the particular read/write request was received; and wherein the method further comprises, for each of a number of the read/write requests stored in the final queue:

executing, by that core, final instructions of the process to carry out the return task at the final stage of the workflow for that read/write request, the return task including returning a result for that read/write request to the requestor from which the particular read/write request was received.

5. A method as in claim 1, wherein the first task is followed by a second task of performing a backend storage access to secondary storage devices of the data storage system; and wherein the method further comprises, for each of the selected ones of the set of the read/write requests in the second queue:

executing, by that core, second instructions of the process for that read/write request to carry out the backend storage access at the second stage of the workflow;

after executing the second instructions, receiving a signal that the backend storage access has completed; and after receiving the signal, transferring that read/write request to a final queue of the queues, the final queue used to temporarily store read/write requests for a final stage of the workflow, the final stage including the return task for each read/write request of returning a response to a requestor from which that read/write request was received.

6. A method as in claim 1, further comprising: providing, to each queue of the queues, a burst size specifying a plural number of read/write requests in that queue for which instructions to carry out a corresponding task are to be executed before executing instructions for read/write requests in a next queue according to the predetermined order; and executing, at each stage of the workflow, instructions for the plural number of read/write requests in the queue to which that stage corresponds, the plural number of read/write requests being no greater than the burst size for the queue to which that stage corresponds, wherein the first burst size is the burst size for the normal queue, and the second burst size is the burst size for the backend queue.

7. A method as in claim 6, wherein providing the burst size to each queue includes assigning an infinite burst size to the high-priority queue, the infinite burst size indicating that instructions for all read/write requests in the high-priority queue are to be executed before executing instructions of read/write requests in lower-priority ones of the queues according to the predetermined order.

8. A method as in claim 1, wherein each core includes a processor cache having a multilevel arrangement of memory including a level one cache being private to that core;

wherein the process run by each core is a single-threaded process that includes a working set of instructions and data, the working set being substantially larger than the level one cache of that core; and wherein the method further comprises forming the set of tasks so that instructions and data for each of the set of tasks is smaller than the level one cache of that core.

9. A data storage system constructed and arranged to process read/write requests received from requestors coupled to ports of the data storage system by a network, each read/write request directed to a respective addressable unit of secondary storage provided by the data storage system, the data storage system comprising:

a set of storage devices providing the addressable units of secondary storage; and a storage processor having memory and a set of cores, each of the set of cores being coupled to the memory, each of the set of cores being constructed and arranged to:

receive a set of the read/write requests from the ports, the set of the read/write requests including multiple read/write requests, and assign each of the set of the read/write requests to be serviced by a process run by that core, the process containing instructions and data and being arranged, upon execution, to carry out a set of tasks performed sequentially at corresponding stages of a workflow by which the set of the read/write requests are fulfilled;

maintain a plurality of queues corresponding to respective stages of the workflow;

store the set of the read/write requests in a first queue of the queues for that core, the first queue being arranged to temporarily hold read/write requests being serviced by the process at a first stage of the workflow;

for each of the set of the read/write requests in the first queue, execute first instructions of the process to carry out a first task of the set of tasks at the first stage of the workflow; and transfer, after the execution of the first instructions for all of the set of the read/write requests in the first queue, only selected ones of the set of the read/write requests from the first queue to a second queue of the queues for that core, the second queue being arranged to temporarily hold the selected ones of the read/write requests to be serviced by the process at a second stage of the workflow, wherein the queues are ordered according to a predetermined order to process the set of the read/write requests at the corresponding stages of the workflow;

wherein the queues include a high-priority queue for storing read/write requests at a corresponding high-priority stage of the workflow;

wherein the predetermined order is a non-linear order in which the high-priority queue is serviced after each servicing of any lower-priority queues, and wherein the predetermined order includes:

first, processing requests of a normal queue to perform a storage cache lookup for a first burst size of read/write requests in the normal queue;

second, performing a return task for each read/write request in the high-priority queue until the high-priority queue is empty;

third, performing a backend storage lookup for a second burst size of read/write requests in a backend queue;

fourth, performing the return task for each read/write request in the high-priority queue until the high-priority queue is empty;

fifth, performing a low-priority task for a request in a low-priority queue; and sixth, performing the return task for each read/write request in the high-priority queue until the high-priority queue is empty.

10. A data storage system as in claim 9, wherein the first task is a storage cache access to a storage cache located either in the memory of the storage processor or in one of the storage devices of the data storage system;

wherein the execution of the first instructions for a first read/write request stored in the first queue results in a storage cache hit; and wherein each of the set of cores is further constructed and arranged to perform the return task to return the result of the storage cache hit to a corresponding requestor of the first read/write request, and to exclude the first read/write request from the selected ones of the set of the read/write requests transferred to the second queue.

11. A data storage system as in claim 9, wherein the first task is a storage cache access to a storage cache located either in the memory of the storage processor or in one of the storage devices of the data storage system;

wherein the execution of the first instructions for plural read/write requests in the first queue results in respective storage cache misses; and wherein each of the set of cores is further constructed and arranged to include the plural read/write requests in the selected ones of the set of the read/write requests transferred to the second queue in the transferring step.

12. A data storage system as in claim 9, wherein each of the queues is arranged to temporarily hold respective read/write requests being serviced by the process at respective stages of the workflow;

wherein one of the queues is a final queue for a final stage of the workflow, the final stage including the return task for a particular read/write request of returning a response to a requestor from which the particular read/write request was received; and wherein each of the set of cores is further constructed and arranged to, for each of a number of the read/write requests in the final queue:

execute, by that core, final instructions of the process to carry out the return task at a final stage of the workflow for that read/write request, the return task including returning a result for that read/write request the requestor from which the particular read/write request was received.

13. A data storage system as in claim 9, wherein the first task is followed by a second task of performing a backend storage access to one of the storage devices; and wherein each of the set of cores is further constructed and arranged to, for each of the selected ones of the set of the read/write requests stored in the second queue:

execute, by that core, second instructions of the process for that read/write request to carry out the backend storage access at the second stage of the workflow;

after executing the second instructions, receive a signal that the backend storage access has completed; and after receiving the signal, transfer that read/write request to a final queue of the queues, the final queue used to temporarily store read/write requests for a final stage of the workflow, the final stage including the return task for each read/write request of returning a response to a requestor from which that read/write request was received.

14. A data storage system as in claim 9, wherein each of the set of cores is further constructed and arranged to:

provide, to each queue of the queues, a burst size specifying a plural number of read/write requests in that queue for which instructions to carry out a corresponding task are to be executed before executing instructions for read/write requests in a next queue according to the predetermined order; and execute, at each stage of the workflow, instructions for the plural number of read/write requests in the queue to which that stage corresponds, the plural number of read/write requests being no greater than the burst size for the queue to which that stage corresponds, wherein the first burst size is the burst size for the normal queue, and the second burst size is the burst size for the backend queue.

15. A data storage system as in claim 14, wherein each core constructed and arranged to provide the burst size to each queue is further constructed and arranged to assign an infinite burst size to the high-priority queue, the infinite burst size indicating that instructions for all read/write requests in the high-priority queue are to be executed before executing instructions of read/write requests in lower-priority ones of the queues according to the predetermined order.

16. A computer program product having a non-transitory, computer-readable storage medium which stores instructions which, when executed by a storage processor of a data storage system, the storage processor having a set of cores, cause the storage processor to perform a method of processing storage read/write requests received from requestors coupled to ports of the data storage system by a network, each storage read/write request directed to a respective addressable unit of secondary storage provided by the data storage system, the method comprising, for each of the set of cores of the storage processor:

receiving a set of the read/write requests from the ports, the set of the read/write requests including multiple read/write requests, and assigning each of the set of the read/write requests to be serviced by a process run by that core, the process containing instructions and data and being arranged, upon execution, to carry out a set of tasks performed sequentially at corresponding stages of a workflow by which the set of the read/write requests are fulfilled;

maintaining, by that core, a plurality of queues corresponding to respective stages of the workflow;

storing, by that core, the set of the read/write requests in a first queue of the queues for that core, the first queue being arranged to temporarily hold read/write requests being serviced by the process at a first stage of the workflow;

for each of the set of the read/write requests in the first queue, executing, by that core, first instructions of the process to carry out a first task of the set of tasks at the first stage of the workflow; and transferring, by that core after the execution of the first instructions for all of the set of the read/write requests in the first queue, only selected ones of the set of the read/write requests from the first queue to a second queue of the queues for that core, the second queue being arranged to temporarily hold the selected ones of the set of the read/write requests to be serviced by the process at a second stage of the workflow, wherein the queues are ordered according to a predetermined order to process the set of the read/write requests at the corresponding stages of the workflow;

wherein the queues include a high-priority queue for storing read/write requests at a corresponding high-priority stage of the workflow;

wherein the predetermined order is a non-linear order in which the high-priority queue is serviced after each servicing of any lower-priority queues, and wherein the predetermined order includes:

first, processing requests of a normal queue to perform a storage cache lookup for a first burst size of read/write requests in the normal queue;

second, performing a return task for each read/write request in the high-priority queue until the high-priority queue is empty;

third, performing a backend storage lookup for a second burst size of read/write requests in a backend queue;

fourth, performing the return task for each read/write request in the high-priority queue until the high-priority queue is empty;

fifth, performing a low-priority task for a request in a low-priority queue; and sixth, performing the return task for each read/write request in the high-priority queue until the high-priority queue is empty.

\* \* \* \* \*